Aug. 28, 1928.  
J. W. WATSON  
1,682,586  
SPRING SHACKLE  
Original Filed July 3, 1919  2 Sheets-Sheet 2

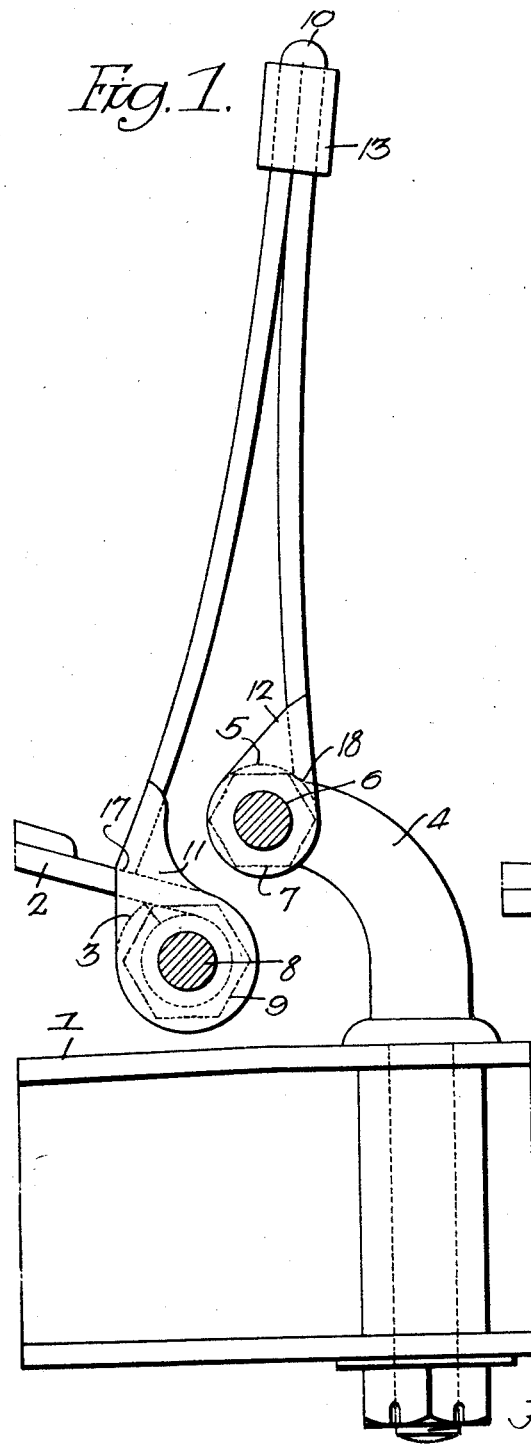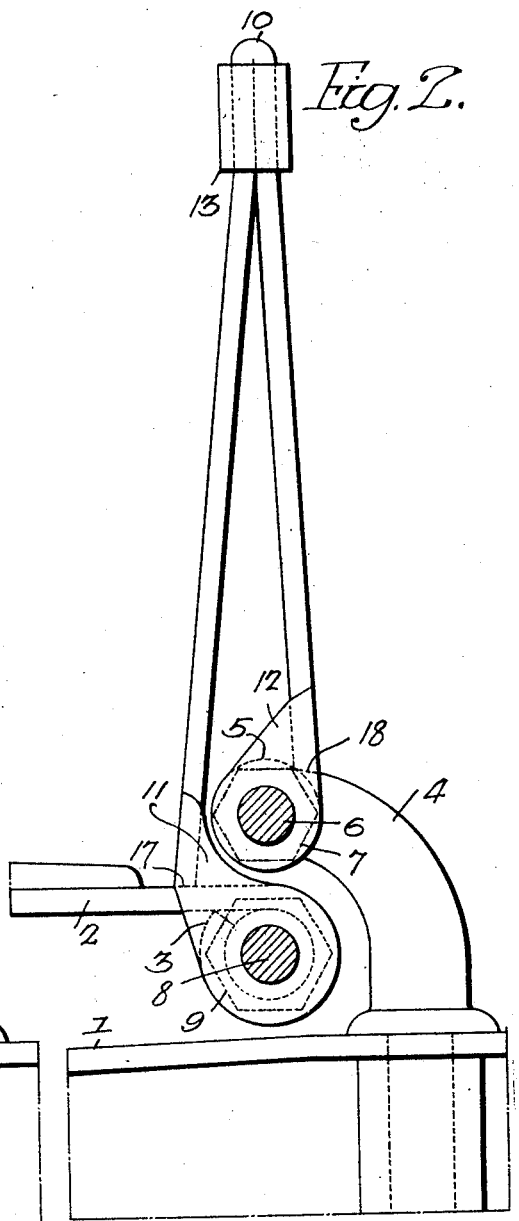

Inventor  
John Warren Watson,  
by his Attorneys  
Howson & Howson

Patented Aug. 28, 1928.

1,682,586

UNITED STATES PATENT OFFICE.

JOHN WARREN WATSON, OF WAYNE, PENNSYLVANIA.

SPRING SHACKLE.

Original application filed July 3, 1919, Serial No. 308,556. Divided and this application filed January 23, 1925. Serial No. 4,285.

My invention relates to novel means for providing a connection or shackle between a vehicle spring and a relatively movable vehicle member.

A principal object of my invention is to provide a shackle or flexible connection, between a vehicle spring and a relatively movable vehicle member, which contains no bearings, bushings, or other parts which would require lubrication, and which would wear and become noisy in service.

A further object of my invention is to provide a shackle or flexible connection, between a vehicle spring and a relatively movable vehicle member, which operates to accommodate the relative horizontal movements between said vehicle spring and said other vehicle member and which permits substantially no vertical movements between said spring and said other vehicle member, reference being made to that portion or end of the spring to which the shackle is attached.

Further objects of my invention are to provide a shackle or flexible connection between a vehicle spring and another vehicle member which is simple to construct, which will stand up satisfactorily in use, which may be easily installed and which, if desired, may be made interchangeable with spring shackles now in common use.

My invention further includes all of the other various novel objects and features of construction and arrangement hereinafter more definitely referred to and described.

While any suitable combination of elements or means may be employed in carrying out my invention I have, for the purpose of illustration, shown in the accompanying drawings and will now proceed to describe, a certain embodiment thereof.

Figure 3:
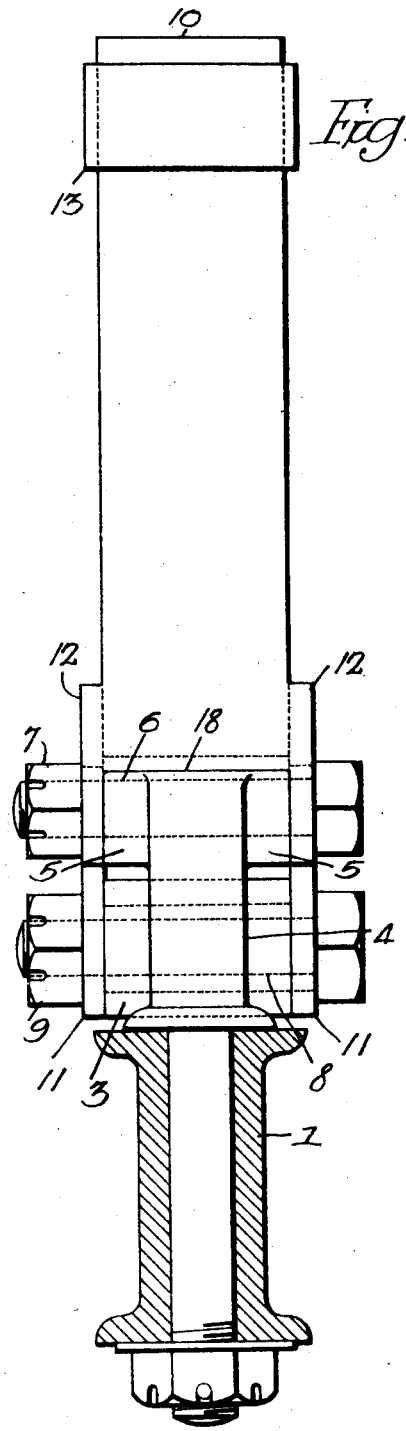
Figure 4:
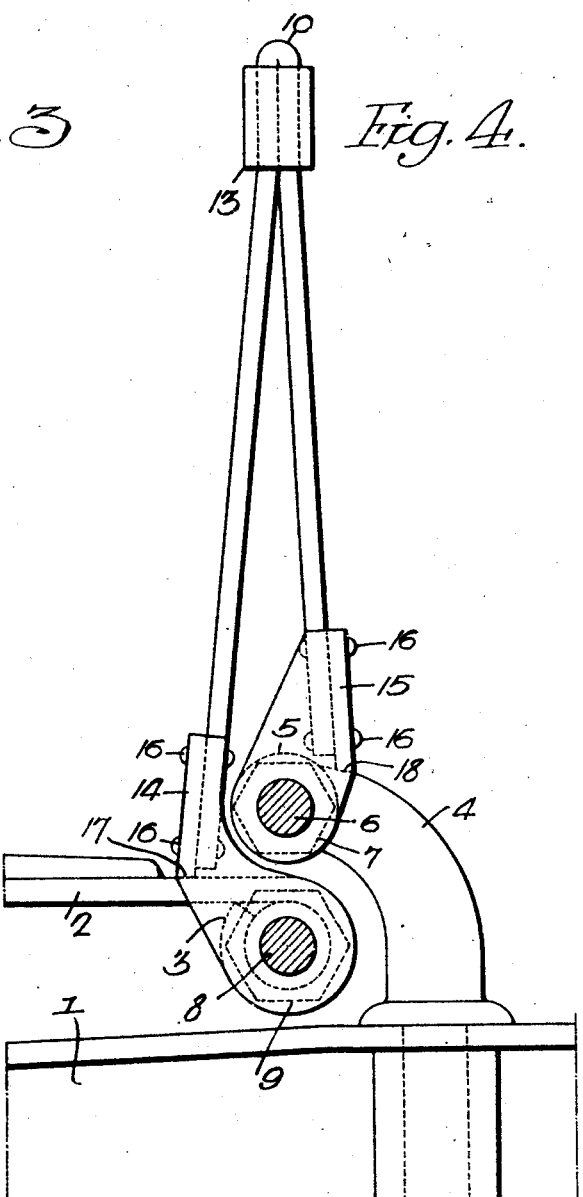

In the embodiment above referred to, Figure 1 shows the parts substantially in the position assumed when the vehicle spring is in normal position. Figure 2 shows the parts substantially in the position assumed when the vehicle spring is compressed. Figure 3 is an end view of Figure 1. Figure 4 shows a modification with respect to a detail of construction.

In the above drawings, (1) is the vehicle axle, and (2) is the vehicle spring relatively movable with respect thereto. The spring (2) is provided with an eye (3) and the axle with an upwardly extending and inwardly turned bracket (4) suitably rigidly secured thereto and provided adjacent its upper extremity with an aperture or eye (5) corresponding to the eye (3) of the spring and adapted for the reception of a bolt (6) carrying a nut (7), or other suitable means by which one part of the shackle may be secured to the bracket. It will be understood that the eye (3) in the spring is similarly adapted for the reception of a bolt (8) carrying a nut (9), or other suitable means by which another part of the shackle may be secured to the spring. The several vehicle parts referred to above are of well known form and construction, their specific details and relative arrangement varying on different makes of vehicles.

My improved shackle is adapted for interpositioning between the bracket and the vehicle spring for the purpose of forming a yielding connection therebetween, and in the form of invention shown in Figures 1 to 4, comprises a resilient member (10) preferably formed of flat spring material and provided at one end, which is adapted to be secured to the vehicle spring, with a pair of ears (11) provided with apertures arranged for the passage of the bolt (8), and at its other end, which is adapted to be secured to the bracket (4), with a substantially similar pair of ears (12) having apertures adapted for the passage of the bolt (6). It will be understood that in this form of the invention the respective pairs of ears are immovably secured to the vehicle parts by bolts (6 and 8) or by other suitable means so that no relative motion may take place at these points, the elongation and shortening occurring as the vehicle spring (2) is flexed, being taken up in the resilient member (10). Provision may be made, such as for example by means of band (13), to keep the flexible member (10) from flexing at any desired point.

Figure 4 is illustrated merely for the purpose of showing a possible modification with respect to the ears (11 and 12). In this modified form these ears, instead of being made integral with the resilient member (10) are made in separate elements or plates (14 and 15) and conveniently rigidly secured, as by rivets (16), adjacent the ends of the resilient member (10).

In the embodiment of my invention shown in Figures 1 to 4, the shackle operates to accommodate the relative horizontal movements between the vehicle spring (2) and the bracket (4), but permits of substantially no vertical movements between the end of the vehicle spring (2) and the bracket (4).

In the embodiment shown in Figures 1 to 4 it will be seen that when the vehicle spring (2) is in a substantially fully compressed position, the resilient member (10) is in substantially a normal position, and that when vehicle spring (2) is in a substantially normal position, the resilient member (10) is in a warped or abnormal position. In view of the above arrangement it is therefore seen that, by means of shoulders (17 and 18) oscillating movement between the ears and the vehicle parts is provided against even without any clamping of the ears to the vehicle parts by means of the bolts and nuts above referred to.

From all of the foregoing it will be understood that my invention provides for supporting various loads without permitting material variations in the relative vertical distance between the spring end and the other vehicle part to which the shackle is attached and at the same time provides for necessary horizontal movements between the spring end and said vehicle part, but without movement, necessity for lubrication, wear, resulting looseness and consequent noise between the shackle and the vehicle parts to which it is attached.

Therefore, while I have herein shown and described one form of my invention and have illustrated it in connection with a well-known form of vehicle construction, I do not thereby desire or intend to limit myself solely thereto, as the specific form and arrangement of the various parts may be modified, as desired, to adapt the invention for various conditions and loads to be supported, and to adapt it for attachment to various other types of vehicles and arrangement of vehicle parts without departing from the spirit and scope of the invention as defined in the appended claims.

Having thus described my invention, I claim and desire to protect by Letters Patent of the United States:

1. For combination with a vehicle supporting spring and a relatively movable vehicle part, a member adapted for rigid attachment to the vehicle spring, a member adapted for rigid attachment to the other vehicle part, and a spring so supported by said members as to permit relative motion between said vehicle parts without necessitating movement between said members and the vehicle parts to which they are respectively rigidly attached, and means for automatically holding said members rigidly to said vehicle parts.

2. In combination with a vehicle body supporting spring and a vehicle part, a member rigidly attached to said vehicle spring, a member rigidly attached to said vehicle part, a spring supported between said rigidly attached members, and means for automatically holding said members rigidly to said vehicle parts.

3. In mechanism to accommodate motion between relatively movable elements, two members adapted for respective rigid attachment to said elements and means so disposed between said members as to permit relative movement between said elements without necessitating respective relative movement between said elements and said members, and means for automatically holding said members rigidly to said vehicle parts.

4. For combination with a vehicle body supporting spring and a vehicle part, resilient means adapted to be disposed between said spring and vehicle part so as to accommodate their normal horizontal relative movements and prevent any substantial relative vertical movements, and means for attaching said resilient means to the spring and to the vehicle part so as to prevent relative movement at the points of attachment.

5. For combinaion with a spring system of a vehicle, a resilient shackle embodying a flat strip of resilient material having a pair of apertured lugs for the insertion of a holding member in assembling the shackle in position in the spring system of the vehicle, said strip of material being so positioned and arranged with relation to said spring system as to be under less bending stress when the vehicle is loaded than when the vehicle is light.

6. For combination with the spring system of a vehicle, a resilient shackle consisting of a flat strip of resilient material having a pair of apertured lugs at each end for the insertion of a holding member in assembling the shackle in position in the spring system of the vehicle said strip of material being so positioned and arranged with relation to said spring system as to be under less bending stress when the vehicle is loaded than when the vehicle is light.

7. For combination with a vehicle spring and a relatively movable vehicle part, a shackle embodying a strip of resilient material having a pair of apertured lugs for the insertion of a holding member for rigid assembly to an end of the vehicle spring, said shackle being so constructed, and adapted to be so arranged and positioned with relation to said vehicle spring and other vehicle part as to substantially unyieldingly support said end of the vehicle spring from vertical movement with relation to the other vehicle part, and permit substantially horizontal movement between the said end of said vehicle spring and said other vehicle part.

8. For combination with a vehicle spring and another relatively movable vehicle part, a resilient shackle having means for rigid attachment to one end of said spring and to said other relatively movable vehicle part and so formed and so positioned with relation to said spring end and said other vehicle part as to maintain substantially constant the vertical separation between said spring end and said other vehicle part and permit substantially horizontal movement between said spring end and said other vehicle part.

9. For combination with a substantially horizontal vehicle body supporting spring and a vehicle part, a resilient shackle adapted for rigid attachment to an end of said vehicle spring and to said other vehicle part and embodying a flat strip of metal bent into the form of a sharp V, one leg of which, when attached to said spring end, is at substantially a right angle thereto, whereby said vehicle spring is substantially unyieldingly supported from vertical movement with relation to the other vehicle part.

10. For combination with a vehicle spring and a relatively movable vehicle part, a resilient shackle constructed for rigid attachment to an end of the vehicle spring and to the other relatively movable vehicle part and arranged to be so positioned with relation to said vehicle parts, as to maintain substantially constant, regardless of body load or force of road impact, the vertical distance between said spring end and said other vehicle part, and at the same time permit relative horizontal movement between said spring end and said other vehicle part.

11. For combination with a vehicle body supporting spring and a vehicle part, a resilient shackle for supporting an end of said vehicle spring with relation to said other vehicle part including a strip of spring material of substantially flat rectangular section, so formed, and adapted to be so positioned with relation to said spring end and said other vehicle part, as to be substantially unyielding to forces tending to vary the vertical distance between said spring end and said other vehicle part, and at the same time be yielding to forces tending to vary the horizontal distance between said spring end and said other vehicle part.

12. For combination with a vehicle spring and another vehicle part, a resilient shackle adapted for attachment to an end of said spring and to said other vehicle part, and means to oppose any tendency of one end of said shackle to turn with relation to the vehicle part to which it may be attached.

13. For combination with a vehicle spring and another vehicle part, a resilient shackle adapted for attachment to an end of said spring and to said other vehicle part, and means to oppose any tendency of both ends of said shackle to turn with relation to the vehicle parts to which they may be respectively attached.

14. For combination with a vehicle spring and another vehicle part, a structure including a flexible member for disposition between an end of said spring and said other vehicle part, means for holding a portion of said structure in fixed relation with said spring end and means for holding another portion of said structure in fixed relation with said other vehicle part, the assembly thus formed presenting a lesser amount of resistance to relative horizontal movement between said spring end and said other vehicle part in a direction length-wise of said spring than to relative horizontal movement between said spring end and said other vehicle part in a direction cross-wise of said spring, and than to relative vertical movement between said spring end and said other vehicle part.

15. For combination with a vehicle spring and another vehicle part, a structure including a resilient member for disposition between an end of said spring and said other vehicle part, means for holding a portion of said structure in fixed relation with said spring end and means for holding another portion of said structure in fixed relation with said other vehicle part, the assembly thus formed presenting a lesser amount of resistance to relative horizontal movement between said spring end and said other vehicle part in a direction length-wise of said spring than to relative horizontal movement between said spring end and said other vehicle part in a direction cross-wise of said spring, and than to relative vertical movement between said spring end and said other vehicle part.

16. For combination with a vehicle spring and another vehicle part, a resilient structure for disposition between an end of said spring and said other vehicle part, means for holding a portion of said structure in fixed relation with said spring end and means for holding another portion of said structure in fixed relation with said other vehicle part, the assembly thus formed presenting a lesser amount of resistance to relative horizontal movement between said spring end and said other vehicle part in a direction length-wise of said spring than to relative horizontal movement between said spring end and said other vehicle part in a direction cross-wire of said spring, and than to relative vertical movement between said spring end and said other vehicle part.

In witness whereof, I have hereunto set my hand this twenty-first day of January, A. D. 1925.

JOHN WARREN WATSON.